United States Patent
Matsuyama

(10) Patent No.: US 8,462,219 B2
(45) Date of Patent: Jun. 11, 2013

(54) IMAGE PICKUP APPARATUS AND IMAGE PROCESSING METHOD OF A PICKED-UP IMAGE

(75) Inventor: Ichiro Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/178,713

(22) Filed: Jul. 8, 2011

(65) Prior Publication Data

US 2012/0033098 A1 Feb. 9, 2012

(30) Foreign Application Priority Data

Aug. 3, 2010 (JP) .................................. 2010-174526

(51) Int. Cl.
| H04N 5/228 | (2006.01) |
| H04N 5/217 | (2011.01) |
| H04N 3/14 | (2006.01) |
| H04N 5/335 | (2011.01) |
| G06K 9/40 | (2006.01) |
| G06K 9/36 | (2006.01) |

(52) U.S. Cl.
USPC ............... 348/208.4; 348/208.99; 348/208.2; 348/208.3; 348/241; 348/296; 382/254; 382/255; 382/275

(58) Field of Classification Search
USPC ...... 348/208.99–208.16, 222.1, 229.1–231.9, 348/239–251, 294–324; 382/254–275, 293–301; 396/52–55
See application file for complete search history.

(56) References Cited

U.S. PATENT DOCUMENTS

| 2004/0160525 | A1* | 8/2004 | Kingetsu et al. ............... 348/364 |
| 2004/0218062 | A1* | 11/2004 | Silverstein et al. ......... 348/222.1 |
| 2005/0057662 | A1* | 3/2005 | Washisu .................... 348/208.99 |
| 2005/0122403 | A1* | 6/2005 | Yoneda ....................... 348/208.6 |
| 2006/0072018 | A1* | 4/2006 | Inaba et al. ............. 348/208.99 |
| 2006/0140602 | A1* | 6/2006 | Kurata et al. .................... 396/55 |
| 2006/0140604 | A1* | 6/2006 | Suda ............................... 396/55 |
| 2006/0251410 | A1* | 11/2006 | Trutna, Jr. ....................... 396/55 |
| 2006/0280249 | A1* | 12/2006 | Poon .......................... 375/240.16 |
| 2007/0115364 | A1* | 5/2007 | Kumaki ................... 348/208.99 |
| 2007/0120997 | A1* | 5/2007 | Sasaki et al. .................. 348/362 |
| 2007/0211960 | A1* | 9/2007 | Sasaki et al. .................. 382/275 |
| 2009/0213231 | A1* | 8/2009 | Kurokawa ................. 348/208.1 |
| 2010/0002116 | A1* | 1/2010 | Ostlund ....................... 348/308 |
| 2010/0141735 | A1* | 6/2010 | Yamashita et al. ............. 348/36 |
| 2010/0231731 | A1* | 9/2010 | Motomura et al. ........ 348/208.4 |
| 2012/0274779 | A1* | 11/2012 | Tanaka et al. ................. 348/164 |

FOREIGN PATENT DOCUMENTS

| JP | 2006-186885 | 7/2006 |
| JP | 2007-020045 | 1/2007 |

* cited by examiner

*Primary Examiner* — Michael Osinski
(74) *Attorney, Agent, or Firm* — Cowan, Liebowitz & Latman, P.C.

(57) ABSTRACT

An image pickup apparatus determines from which position in a plurality of photographed frames a pixel of each of lines of an image to be output is read out, on the basis of a motion amount at a photographing time of each of the lines of a photographed predetermined frame, and if the determined read-out position is located on the outside of a photographing range of the predetermined frame, then determines to read out a pixel in a frame photographed before and/or after a photographing of the predetermine frame as the pixel of the output image and calculates a read-out position of the pixel on the basis of the motion amount at a photographing time of each of the lines in the frame.

8 Claims, 17 Drawing Sheets

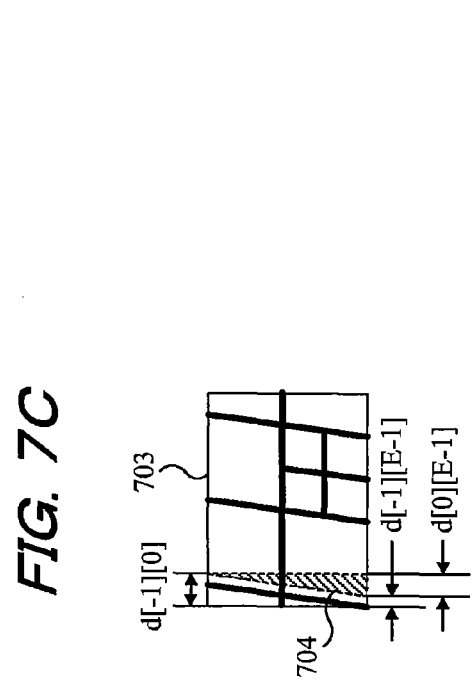
FIG. 7A  FIG. 7B  FIG. 7C
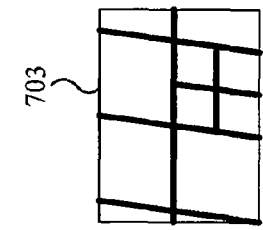
FIG. 7E
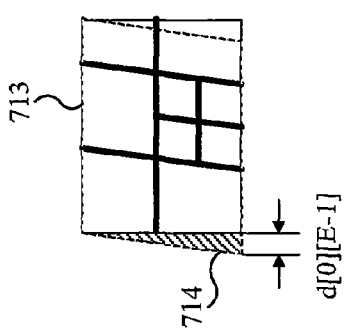
FIG. 7D  FIG. 7F
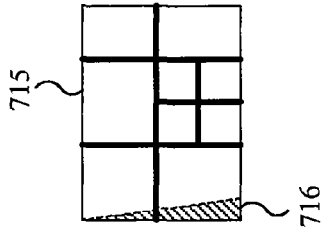
FIG. 7G
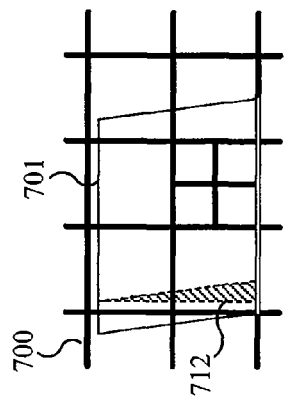
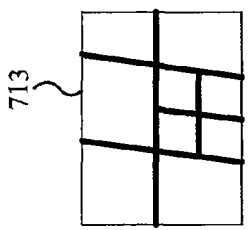
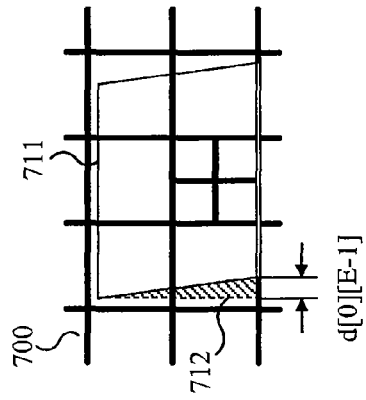

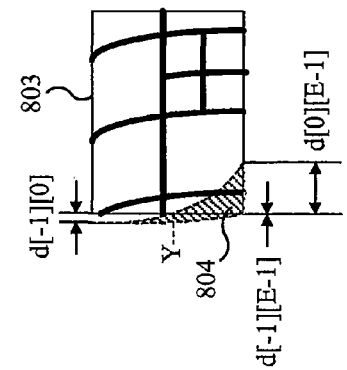
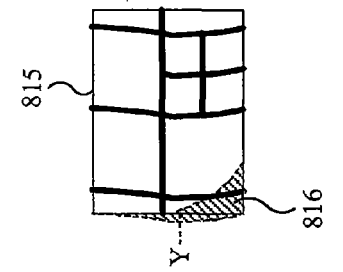
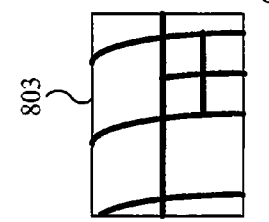
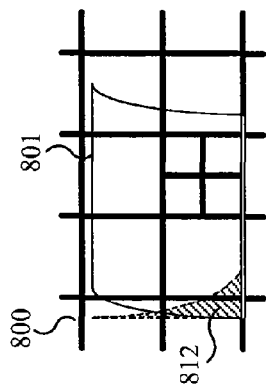
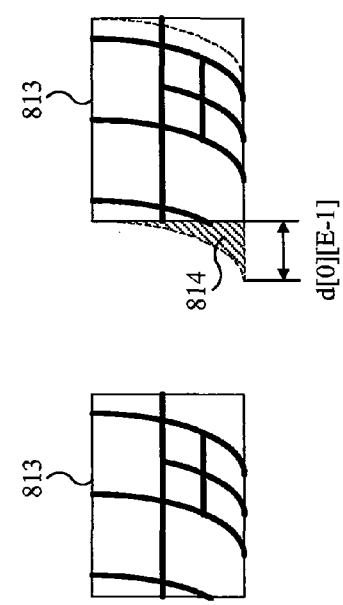
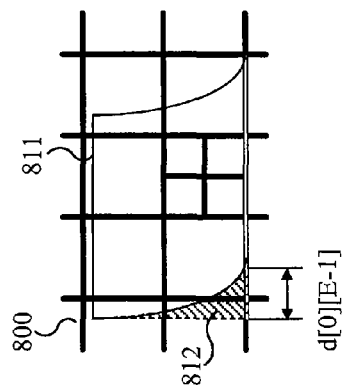

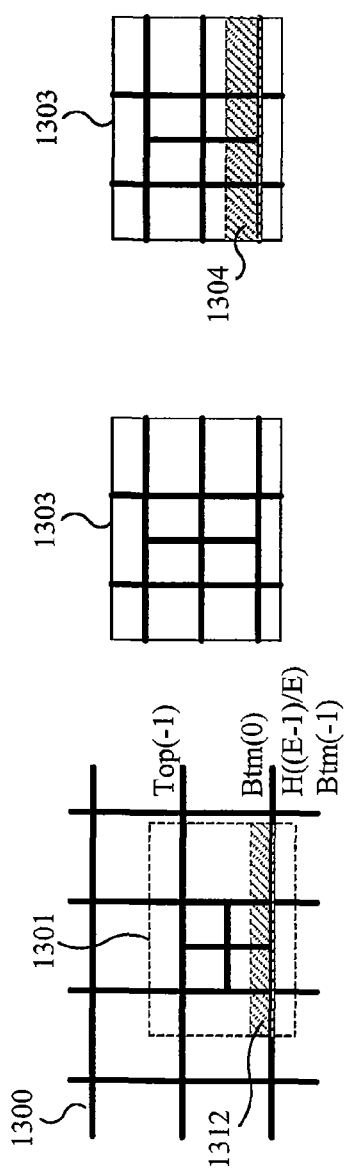
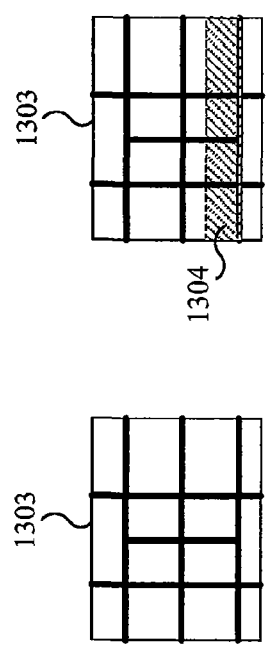
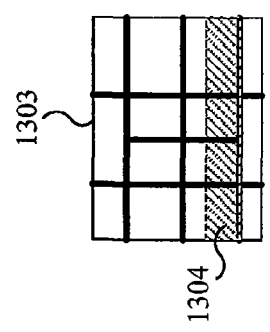
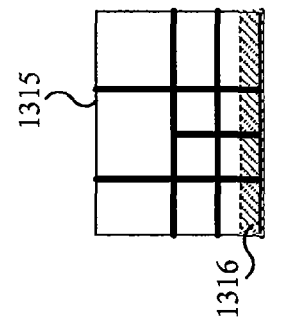
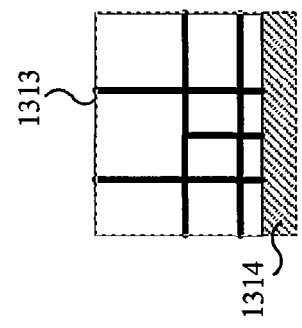
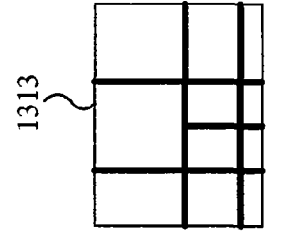
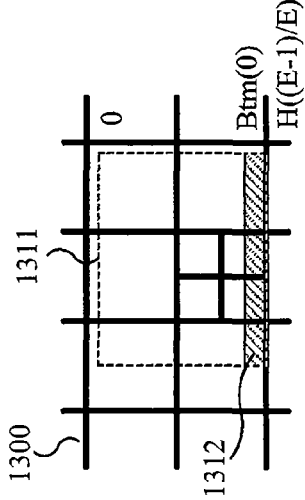

IMAGE PICKUP APPARATUS AND IMAGE PROCESSING METHOD OF A PICKED-UP IMAGE

BACKGROUND OF THE INVENTION

1. Field of the Invention

The present invention relates to an image pickup apparatus, such as a video camera and a digital camera, and more particularly to an image pickup apparatus having a function of correcting the distortion of an image photographed by an image pickup sensor of a rolling-shutter type and an image processing method of a picked-up image.

2. Description of the Related Art

In recent years, many video cameras and digital cameras use CMOS image pickup sensors of the rolling shutter type. Each of the image pickup sensors of this type has a time lag of image pickup in each line (horizontal scanning), and consequently the image pickup sensor has the problem in which a photographed image is distorted in a diagonal direction in panning, the problem in which a photographed image is expanded or contracted in tilting, and the problem in which a photographed image is distorted into a waved form due to camera shaking.

When a still image is photographed with such a camera, the time lag of image pickup is frequently removed by sensor driving in a global-shutter method and a combination of mechanical shutters. However, these methods are not suited for photographing moving images because these methods cannot simultaneously perform exposure to a sensor and the read-out of an image from the sensor so that the interval of image pickup becomes long.

Some cameras photographing moving images by the rolling-shutter method store photographed images in buffer memories, shift a read-out position of each of the lines, clip out parts of stored images to output them, and thereby correct the distortion of photographed images. The read-out position of each of the lines is determined by detecting in advance the motion amounts of the cameras to objects with gyro sensors or the like.

For example, as illustrated by a broken line in FIG. 16A, if an object 1600 is photographed when a camera stands still, a range 1601 is photographed, and a photographed image 1602 including no distortion as illustrated in FIG. 16B is stored in the buffer memory of the camera. On the other hand, when the camera is panning to the right side, as illustrated in FIGS. 16C and 16D, a range 1611 is photographed, and a photographed image 1612 distorted in a diagonal direction is stored. Accordingly, as illustrated in FIGS. 16E and 16F, an image 1614 including corrected distortion is output by clipping out a range 1613 while shifting the read-out position of each of the lines by using a detection result of the motion amount.

Moreover, when the camera is standing still, as illustrated in FIGS. 17A and 17B, a range 1701 of an object 1700 is photographed, and a photographed image 1702 including no expansion and contraction is stored in the buffer memory. However, when the camera is tilting downwards, as illustrated in FIGS. 17C and 17D, a range 1711 is photographed, and a longitudinally contracted photographed image 1712 is stored. Accordingly, as illustrated in FIGS. 17E and 17F, an image 1714 which is contraction-corrected by clipping out a range 1713 while shifting the read-out position of each of the lines by using the detection result of the motion amount, is output. Moreover, if the camera is tilting upwards, as illustrated in FIGS. 17G and 17H, a range 1721 is photographed, and a longitudinally expanded photographed image 1722 is stored. Accordingly, as illustrated in FIGS. 17I and 17J, an image 1724 which is expansion-corrected by clipping out a range 1723 while shifting the read-out position of each of the lines by using a detection result of the motion amount, is output.

Japanese Patent Application Laid-Open No. 2006-186885 describes a camera arranged to perform correction by bringing a clipping-out position of an output image to the center in order to avoid the situation in which the clipping-out position is very close to the edge of a photographed image when camera shaking becomes large so that remain no margin of the angle of view remains and distortion cannot be corrected.

Moreover, Japanese Patent Application Laid-Open No. 2007-020045 describes a camera arranged to correct distortion including only expansion and contraction in a buffer memory by avoiding distortion in any diagonal direction in a photographed image by replacing the horizontal scanning and the vertical scanning of an image pickup sensor with each other according to the panning or the tilting of a camera.

However, because the conventional correction methods each clip out a part of an image to output the part, the angle of view of the output image becomes narrower than that of a photographed image.

For example, some digital cameras of a lens-exchangeable type make their abilities to record the angles of views capable of being photographed with their lenses a major advantage. Moreover, some digital cameras of a lens-integrated type are configured to have short focal lengths on their wide angle sides and also make their abilities to photograph objects at wide angles a major advantage. However, if a part of an image is clipped out, these features of the cameras become useless. Furthermore, if a part of an image is clipped out, the number of effective pixels of an image pickup sensor decreases, and consequently it becomes difficult to photograph a higher definition image in comparison with the case of performing no correction.

Moreover, the replacement of the scanning directions in an image pickup by the rolling-shutter method makes the read-out and the processing mechanism of an image pickup signal from an image pickup sensor complex.

SUMMARY OF THE INVENTION

An aspect of the present invention is to provide an apparatus and a method enabling the correction of the distortion of a photographed image caused by an image pickup sensor of the rolling-shutter type without narrowing the angle of view of an output image. Moreover, the present invention aims at providing an apparatus and a method capable of correcting the distortion without decreasing the number of effective pixels of the image pickup sensor and also eliminating the need for changing the image pickup configuration of the image pickup sensor.

In order to attain the above-described aspect of the present invention, an image pickup apparatus of the present invention includes; a photographing unit configured to continuously photograph a plurality of frames in accordance with a rolling-shutter method, a buffer memory configured to store a photographed image of a plurality of photographed frames, a motion detection unit configured to continuously detect a motion amount of an object a plurality of times, a memory configured to store the detected motion amounts, a correction unit configured to read out the photographed image stored in the buffer memory, and an output unit configured to output an image corrected by the correction unit, wherein the correction unit determines from which position in the plurality of photographed frames a pixel of each of lines of the image to be output is read out, on the basis of the motion amount at a photographing time of each of the lines of a predetermined frame of the photographed image, and wherein if the determined read-out position is located on the outside of a photographing range of the predetermined frame, the correction unit then determines to read out a corresponding pixel in a frame photographed before and/or after a time of photographing the predetermine frame as the pixel of the image to be output, and calculates a read-out position of the pixel on the basis of the motion amount at the photographing time of each of the lines in the frame from which the corresponding pixel is read out.

Further features of the present invention will become apparent from the following description of exemplary embodiments with reference to the attached drawings.

BRIEF DESCRIPTION OF THE DRAWINGS

FIGS. 7A, 7B, 7C, 7D, 7E, 7F, and 7G are schematic views of photographed images for describing the distortion correction of the panning of the video camera of the first embodiment of the present invention.

FIGS. 8A, 8B, 8C, 8D, 8E, 8F, and 8G are schematic views of photographed images for describing the distortion correction of the panning including reverse of the video camera of the first embodiment of the present invention.

FIGS. 13A, 13B, 13C, 13D, 13E, 13F, and 13G are schematic views of photographed images for describing the distortion correction of the photographed images brought about by the tilting of a video camera into the upper direction.

DESCRIPTION OF THE EMBODIMENTS

Exemplary embodiments of the present invention will now be described in detail in accordance with the accompanying drawings.

In the following, exemplary embodiments of the present invention will be described with reference to the accompanying drawings. In the present embodiments, a case of applying the present invention to a video camera outputting a photographed moving image will be described. However, the application of the present invention is not limited to these embodiments, and it is needless to say that the present invention can also be applied to the other image pickup apparatus, such as a digital camera, receiving a moving image in accordance with a rolling-shutter method as an input image.

First Embodiment

Figure 1:
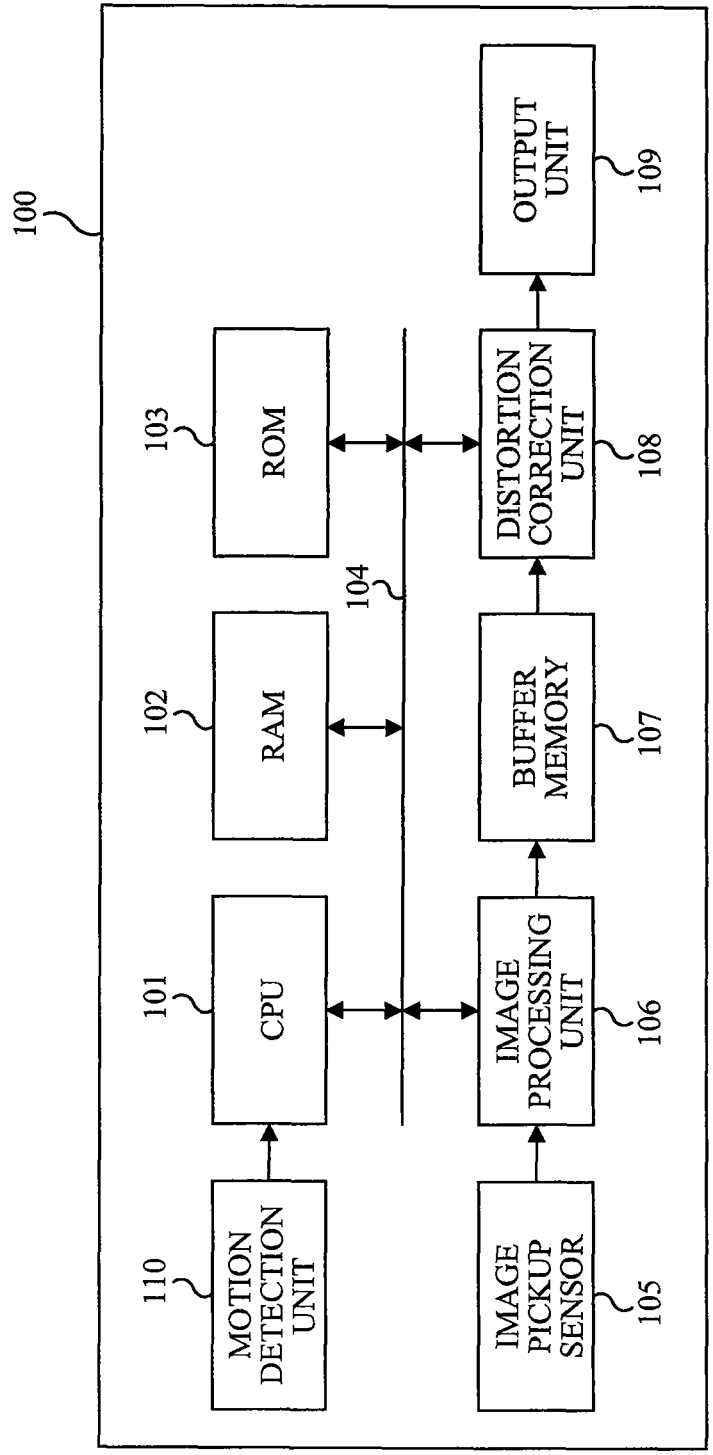
FIG. 1 is a block diagram illustrating the configuration of a video camera according to an exemplary embodiment of the present invention.

FIG. 1 is a block diagram illustrating a configuration example of a video camera 100 of a first embodiment of the present invention.

A CPU 101 operates in conformity with a control program stored in a ROM 103 and controls each block connected with one another through a CPU bus 104 by using a RAM 102 as a temporary storage area of data at the time of an operation. An image pickup sensor 105 is a CMOS image pickup sensor of the rolling shutter type and converts an optical image focused on an image pickup plane into an electric signal to output an image signal. The rolling-shutter method is a method of photographing each of lines by horizontal scanning and a frame composed of a plurality of the lines by vertical scanning. An image processing unit 106 performs development processes, such as a color conversion process, a gamma correction process, and the like, to the image signal output from the image pickup sensor 105 and stores the obtained photographed image data into a buffer memory 107 under the control of the CPU 101. A distortion correction unit 108 reads out photographed image data stored in the buffer memory 107 and corrects the distortion of the read-out photographed image caused by the rolling-shutter method under the control of the CPU 101. An output unit 109 outputs an image signal in which the distortion is corrected by the distortion correction unit 108, to the outside. A motion detection unit 110 is a gyro sensor and detects a motion amount of the body of the video camera 100 to inform the CPU 101 of the detected motion amount. The other sensors may be used as the motion detection unit 110 as long as the sensors can detect the motion amount of the camera body, such as panning and tilting. Moreover, the motion detection unit 110 may be configured to detect the motion amount by obtaining a motion vector from a positional correlation between frames by using the photographed image data stored in the buffer memory 107.

Figure 2:
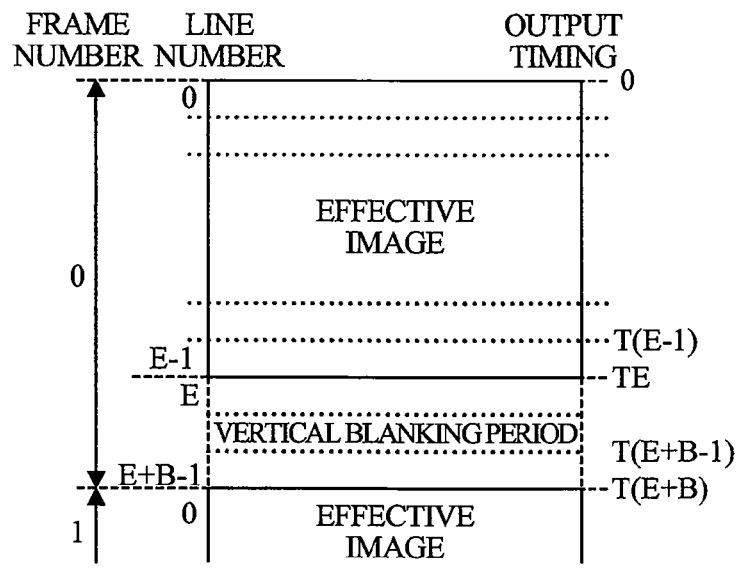
FIG. 2 is an outline view illustrating image signal output timings from an image pickup sensor.

FIG. 2 illustrates the image signal output timing of each of the lines by the image pickup sensor 105. A rectangular region cut off by dotted lines indicates an image signal for one line (lines in the intermediate part are omitted), and each of the image signals is output with a time lag T toward the lower direction in the figure in the order of the lines. That is, if the output timing of a first line 0 of a frame 0 is set to 0 in the image pickup sensor 105 including an effective image of the number of lines E, then the output timing of a bottom line E−1 becomes T×(E−1). There is a vertical blanking period corresponding to the number of lines B before outputting the next frame 1, and if the vertical blanking period is included, the output time of an image signal for one frame becomes T×(E+B). Incidentally, there are also a horizontal blanking period, an optical black (OB) region, and the like in an image signal output of a real image pickup sensor, but these ones are omitted for simplifying the description here.

Figure 3:
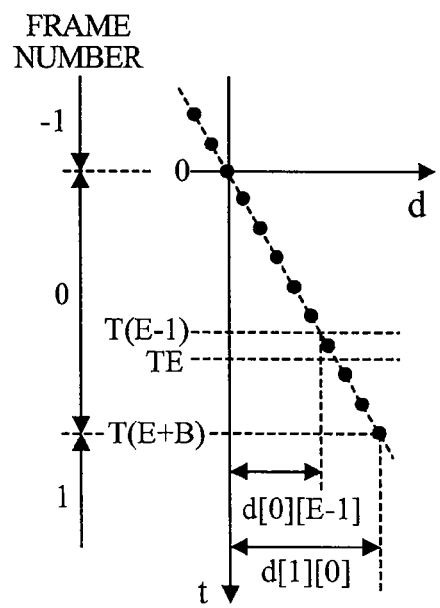
FIG. 3 is a schematic view for describing the motion detection of the video camera.

FIG. 3 illustrates examples of motion amounts d (abscissa axis) in the horizontal direction detected by the motion detection unit 110 in accordance with the passage of time (ordinate axis) when the video camera 100 moves into the right side direction (panning). The motion detection unit 110 detects the motion amounts d (the motion amounts into the horizontal direction in case of the present embodiment) a plurality of times continuously as illustrated by black dots in FIG. 3 during a period in which an image signal for one frame is being output from the image pickup sensor 105. The motion amounts d are expressed here as relative positions to the line 0 of the frame 0 as a reference with signs set to be positive in the direction toward the right side. The motion amount d[0][e] at the time of outputting an arbitrary line e in the frame 0 can be obtained by calculating by interpolating the detected plurality of motion amounts d. For example, the interpolated motion amount at the time of outputting the bottom line E−1 of the frame 0 can be expressed to be d[0][E−1]. The detected motion amounts and the motion amounts obtained by interpolation are stored in the RAM 102 under the control of the CPU 101.

Figure 4:
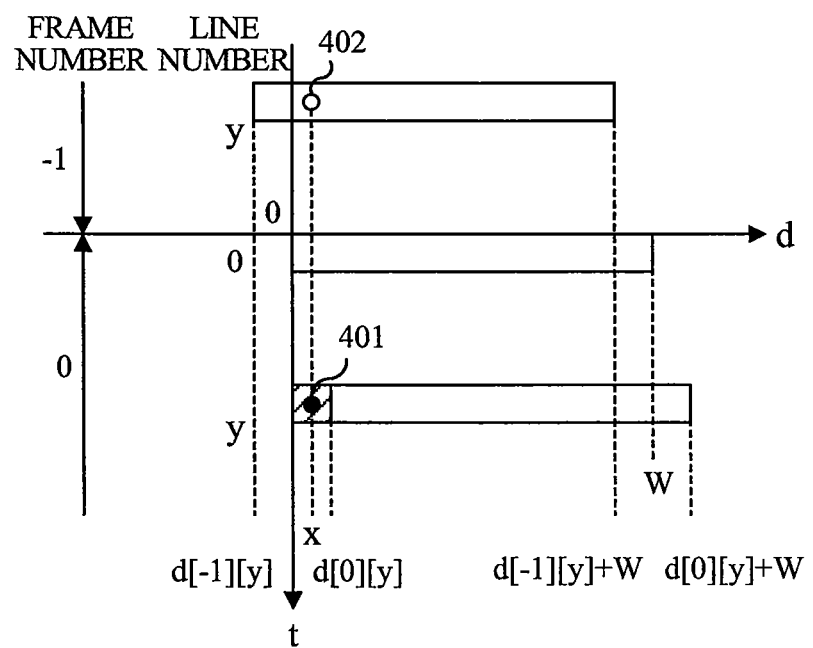
FIG. 4 is a schematic view illustrating a photographing range of each of lines of photographed image data stored in a memory.

FIG. 4 illustrates examples of photographing ranges of the respective lines of photographed image data stored in the buffer memory 107 at the respective photographing times t of the lines in a case where the video camera 100 moves into the direction toward the right side. The photographed image data of the frame 0 being photographed and the preceding frame −1 thereof is stored in the buffer memory 107, and the rectangular regions cut off by solid lines in FIG. 4 indicate the photographing ranges of the respective lines of the frames 0 and −1 in the horizontal direction. Because there is a time lag for image pickup on the line basis, the photographing ranges gradually shift into the horizontal direction according to the motion of the body of the video camera 100 into the direction toward the right side. For example, assuming that the left end of the line 0 of the frame 0 is denoted as a horizontal position 0, the photographing range of the line 0 is composed of horizontal positions of from 0 to W, and the photographing range of a line y is composed of horizontal positions of from d[0][y] to d[0][y]+W on the basis of the motion amount d[0][y]. Moreover, the photographing range of the line y of the frame −1 is composed of horizontal positions of from d[−1][y] to d[−1][y]+W on the basis of the motion amount d[−1][y]. W denotes the number of horizontal pixels of the image pickup sensor here.

The distortion correction unit 108 uses a predetermined line (the line 0 in the present embodiment) as a reference and corrects the shifts of the photographing ranges of the other lines of the same frame. Because the motion of the video camera 100 is performed in the horizontal direction in the example of FIG. 4, the distortion correction unit 108 performs the correction of a pixel (x, y) of the output image of a photographed image by reading out the position of the line y of the photographed image shifted into the horizontal direction. Incidentally, it is supposed here that the magnifications of the photographed image and the output image are equal in order to simplify the description. However, the photographing range of the line y of the frame 0 illustrated in FIG. 4 exceeds the photographing range of the line 0 which is the reference (the excess part is denoted as the shaded area). When the motion of the video camera 100 remains being in the same direction from the preceding frame −1 to the frame 0 as illustrated in FIG. 4, the shaded area exists in the photographing range of the past frame, and accordingly the line y of the preceding frame −1 is used as a substitute read-out source. For example, because a read-out position 401 is located on the outside of the photographing range of the line y of the frame 0, a read-out position 402 of the line y of the frame −1 is used in place of the read-out position 401. The determination method of the frame (reference frame) from the photographed image data of which line data is read out will be described in the following.

Figure 5:
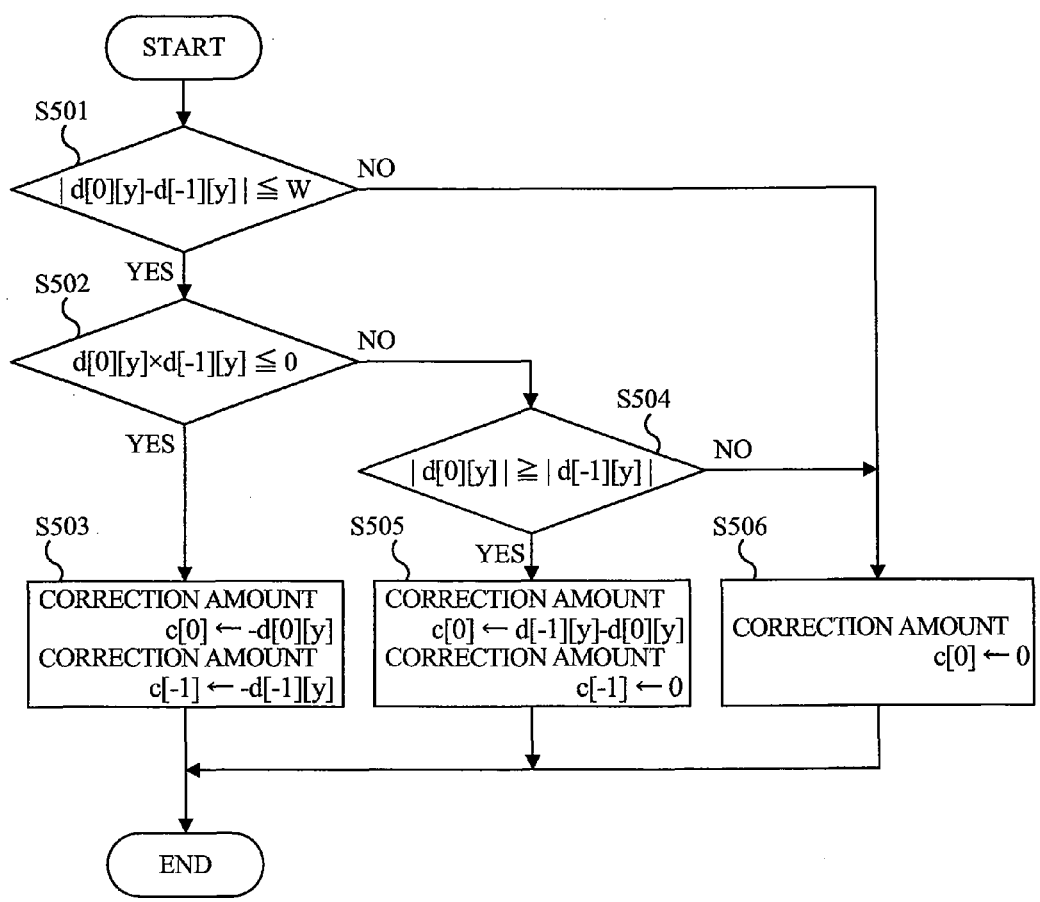
FIG. 5 is a flow chart illustrating a flow for determining a correction amount c of lines of photographed image data according to a first embodiment of the present invention.

FIG. 5 is a flow chart of the operation of the distortion correction unit 108 to determine a correction amount c[0] for correcting a shift of the photographing range of the line y of the frame 0 and a correction amount c[−1] for correcting a shift of the photographing range at the time of reading out the line y of the frame −1 in place of the frame 0. The processing of this flow chart is achieved by the CPU 101 which reads out a control program stored in the ROM 103 and then executes the read-out control program.

First, at Step S501, the CPU 101 determines whether a change (difference) between the motion amount d[0][y] of the line y of the frame 0 which is being photographed and the motion amount d[−1][y] of the line y of the preceding frame −1 is less than the number of the horizontal pixels W of the image pickup sensor 105 or not. When the change is equal to or more than the number of the horizontal pixels W, the change exceeds the correction limit, and consequently the CPU 101 sets the correction amount c[0] of the frame 0 to 0 at Step S506. In this case, because the frame −1 is not used for the correction, nothing is set to the correction amount c[−1] of the frame −1. If the change is less than the number of the horizontal pixels W, the CPU 101 determines whether the product of the motion amount d[0] [y] of the line y of the frame 0 and the motion amount d[−1][y] of the line y of the frame −1 is negative or not at Step S502. If the product is negative, the photographing ranges of the lines y of the frame 0 and the frame −1 shift into the counter directions of the left and the right sides on the basis of the line 0 of the frame 0 as the reference, and consequently the lacking part of the photographing range of the frame 0 (the shaded area illustrated in FIG. 4) can be corrected by using the photographing range of the frame −1. Accordingly, the CPU 101 sets the correction amount c[0] of the frame 0 to −d[0][y] from the motion amount of the line y of the frame 0 and sets the correction amount c[−1] of the frame −1 to −d[−1][y] from the motion amount of the line y of the frame −1 at Step S503. On the other hand, if the product of the motion amounts of the lines y of the frame 0 and the frame −1 is positive, the photographing ranges of the lines y of the frame 0 and the frame −1 deviate in the same directions with respect to the line 0 of the frame 0 as the reference. Consequently, the lacking part of the photographing range of the frame 0 cannot be completely corrected even by using the photographing range of the frame −1. Accordingly, the CPU 101 determines whether the motion amount d[−1][y] of the line y of the frame −1 is smaller than the motion amount d[0][y] of the line y of the frame 0 or not at Step S504. If the motion amount of the frame −1 is smaller than the motion amount of the frame 0, the frame −1 is closer to the photographing range (of the line 0 of the frame 0) of the reference, and consequently a part of the lacking part of the frame 0 can be corrected. Accordingly, the CPU 101 sets the correction amount c[0] of the frame 0 to d[0][y]−d[−1][y] on the basis of the difference of the motion amounts of the lines y of the frame 0 and frame −1 and sets the correction amount c[−1] of the frame −1 to 0 at Step S505. If the motion amount of the frame −1 is larger than the motion amount of the frame 0, the CPU 101 sets the correction amount c[0] of the frame 0 to 0 at Step S506. In this case, because the frame −1 is not used for the correction, the CPU 101 does not set anything to the correction amount c[−1] of the frame −1.

Incidentally, the CPU 101 determines whether the change exceeds the correction limit or not, for every line at Step S501 of FIG. 5. But, if a line on which the change does not exceed the correction limit and a line on which the change exceeds the correction limit are successive in the same frame, the correction amounts of the lines become discontinuous. Accordingly, if the motion detection unit 110 detects a motion exceeding the number of horizontal pixels of the image pickup sensor 105 in comparison with that of the proceeding frame, the CPU 101 controls the distortion correction unit 108 not to perform the distortion correction to the whole frame.

Figure 6:
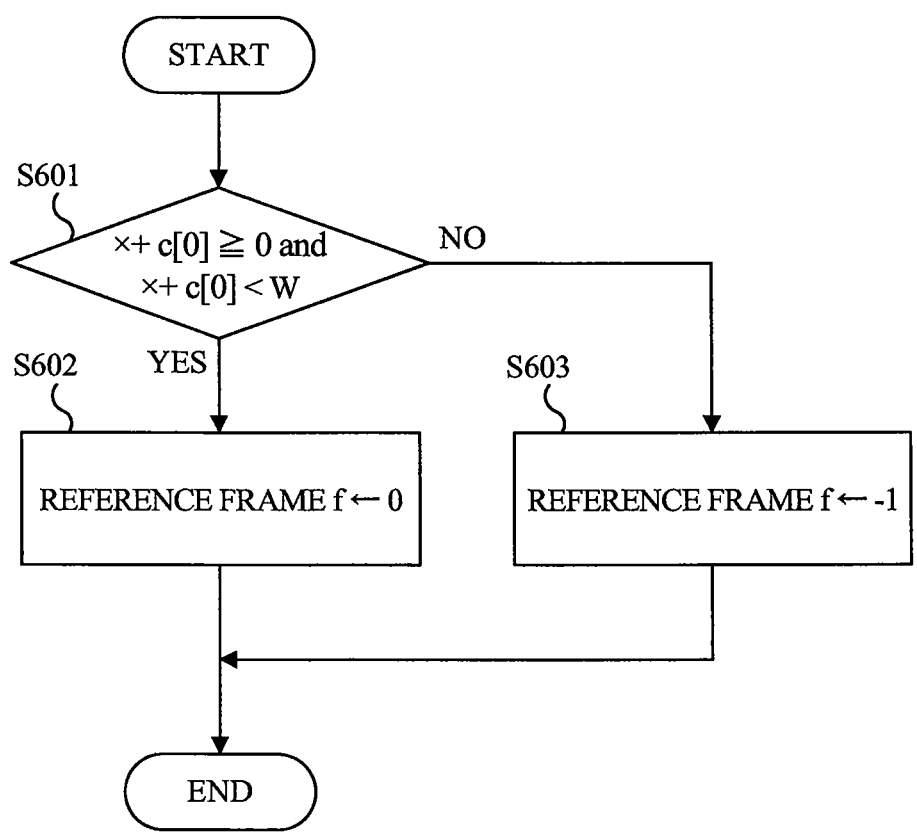
FIG. 6 is a flow chart illustrating a flow for determining a reference frame f of a pixel (x, y) according to the first embodiment of the present invention.

FIG. 6 is a flow chart of an operation of the distortion correction unit 108 to determine the reference frame f of a pixel (x, y) in the frame 0. First, at Step S601, the distortion correction unit 108 determines whether a horizontal position x+c[0] of the pixel including an added correction amount c[0] of the frame 0 is within the photographing range of the line y of the frame 0 or not. If the horizontal position x+c[0] is within the photographing range, the CPU 101 sets the reference frame f to the frame 0 at Step S602. At this time, the pixel (x+c[0], y) of the frame 0 becomes a read-out source. That is, the pixel (x+c[0], y) is read out as correction data. If the horizontal position x+c[0] is not within the photographing range, the CPU 101 sets the reference frame f to the frame −1 at Step S603. At this time, the CPU 101 sets the correction amount c[−1] of the line y of the frame −1 to d[−1][y] on the basis of the motion amount thereof, and the pixel (x+c[−1], y) of the frame −1 becomes a read-out source.

FIGS. 7A to 7G illustrates examples of distortion correction by the distortion correction unit 108 to images photographed by the video camera 100 while moving to the direction toward the right side at a constant speed. As illustrated in FIGS. 7A and 7B, a range 701 of an object 700 is photographed in the frame −1, and a photographed image 703 is stored in the buffer memory 107. Moreover, as illustrated in FIGS. 7D and 7E, a range 711 of an object 700 is photographed in the frame 0, and a photographed image 713 is stored in the buffer memory 107. Although it is necessary to read out the region enclosed by a broken line illustrated in FIG. 7F in order to correct the distortion of the photographed image 713 by using the first line of the photographed image 713 as a reference, the shaded area 714 is located on the outside of the range of the photographed image 713. This part corresponds to a shaded area 712 adjoining to the photographing range 711 of the frame 0 illustrated in FIG. 7D, and the shaded area 712 is included in the photographing range 701 of the frame −1 illustrated in FIG. 7A. The distortion correction unit 108 sets a shaded area 704 included in the photographed image 703 of the frame −1 illustrated in FIG. 7C as a read-out source in place of the shaded area 714 located on the outside of the photographed image 713 of the frame 0 by the processing of the flow chart illustrated in FIGS. 5 and 6. As a result, as illustrated in FIG. 7G, an output image 715 of the frame 0 in which distortion has been corrected is output without lacking a shaded area 716 of the frame 0.

The width of each of the lines e (=0 to E−1) in the shaded area 714 located on the outside of the photographed image 713 illustrated in FIG. 7F is equal to the motion amount d[0][e] of each of the lines e, and the right end of each of the lines e contacts with the left end of the photographed image 713. The width of each of the lines e (=0 to E−1) in the shaded area 704 of the photographed image 703 illustrated in FIG. 7C is equal to that of the shaded area 714, and the left end of each of the lines e is situated at a position which is spaced from the left end of the photographed image 703 by the motion amount d[−1][e] of each of the lines e. That is, the position and the shapes of the shaded area are determined on the basis of the motion amount of each of the lines in the frame 0 and the frame −1.

FIGS. 8A to 8G illustrates examples of distortion correction by the distortion correction unit 108 to the images photographed by the video camera 100 while gradually changing the movement thereof into the direction toward the left side to one into the direction toward the right side. As illustrated in FIGS. 8A and 8B, a range 801 of an object 800 is photographed in the frame −1, and a photographed image 803 is stored in the buffer memory 107. Moreover, as illustrated in FIGS. 8D and 8E, a range 811 of the object 800 is photographed in the frame 0, and a photographed image 813 is stored in the buffer memory 107. Although it is necessary to read out the region enclosed by a broken line illustrated in FIG. 8F in order to correct the distortion of the photographed image 813 by using the first line of the photographed image 813 as a reference, a shaded area 814 is located on the outside of the range of the photographed image 813. This part corresponds to a shaded area 812 contacting with the photographing range 811 of the frame 0 illustrated in FIG. 8D, and the photographing range 801 of the frame −1 illustrated in FIG. 8A and the shaded area 812 overlap with each other in a large part but do not overlap with each other in some parts. The distortion correction unit 108 sets the region in which the photographed image 803 and a shaded area 804 of the frame −1 illustrated in FIG. 8C overlap with each other as a read-out source in place of the shaded area 814 located on the outside of the photographed image 813 of the frame 0 by the process of the flow chart illustrated in FIGS. 5 and 6. Because the region in which the photographed image 803 and the shaded area 804 do not overlap with each other exists, the distortion correction unit 108 does not completely correct the distortion of the frame 0 and determines the correction amount of each of the lines in the range not exceeding the photographed image 803 of the frame −1. As a result, as illustrated in FIG. 8G, an output image 815 of the frame 0 in which distortion has been corrected within a capable range is output without lacking a shaded area 816.

The width of each of the lines e (=0 to E−1) in the shaded area 814 located on the outside of the photographed image 813 illustrated in FIG. 8F is equal to the motion amount d[0][e] of each of the lines e, and the right end of each of the lines e contacts with the left end of the photographed image 813. The width of each of the lines e (=0 to E−1) in the shaded area 804 of the photographed image 803 illustrated in FIG. 8C is equal to that of the shaded area 814, and the left end of each of the lines e is situated at a position which is spaced from the left end of the photographed image 803 by the motion amount d[−1][e] of each of the lines e (in consideration of the positive and the negative signs). Because there are no regions in which the photographed image 803 and the shaded area 804 overlap with each other in the lines before the line Y illustrated in FIGS. 8C and 8G, the corresponding part (before the line Y) of the output image of the frame 0 illustrated in FIG. 8G does not corrected completely. The corresponding part (after the line Y) of the frame 0 is corrected by the quantities of the widths of the lines after the line Y in which the photographed image 803 and the shaded area 804 overlap with each other. That is, the positions and the shape of the shaded area are determined on the basis of the motion amount of each of the lines in the frame 0 and the frame −1.

According to the present embodiment, even if the angle of view of an output image is not made to be narrower than that of a photographed image, the distortion of a picked-up image by an image pickup sensor of the rolling-shutter type can be corrected. Moreover, the rolling-shutter distortion of a photographed image can be corrected only by controlling the reading-out of a picked-up image without introducing any configurations such as the replacement of scanning directions into an image pickup sensor.

Second Embodiment

Next, a second embodiment of the present invention will be described.

Because the video camera of the present embodiment has the same configuration as that of the video camera 100 of FIG. 1, the description of the configuration is omitted. In the present embodiment, the distortion correction unit 108 uses an intermediate line as a reference in place of the first line to correct the shifts of the photographing ranges of the other lines in the same frame.

The output timing of the intermediate line E/2 as a reference is set to 0, and the motion amount d[0] [e] of an arbitrary line e in the frame 0 at the time of being output can be obtained from a detection result of the motion detection unit 110. For example, the motion amount of the first line 0 of the frame 0 at the time of the output thereof is d[0][0], and the motion amount of the bottom line E−1 at the time of the output thereof is d[0][E−1].

The buffer memory 107 stores the photographed image data of the frame 1 which is being photographed, the preceding frame 0, and the frame −1 preceding to the frame 1 by two frames, and the distortion correction unit 108 performs the distortion correction of the frame 0. The distortion correction unit 108 uses the intermediate line E/2 as a reference and corrects the shifts of the photographing ranges of the other lines in the same frame. If a motion of the video camera 100 is provided in the horizontal and the same direction, the distortion correction unit 108 needs a past photographing range located on the outside of the present photographing range at the time of performing the correction of the sifts of the lines following the intermediate line E/2 similarly to the first embodiment. On the other hand, the distortion correction unit 108 needs a future photographing range to be located on the outside of the photographing ranges of the lines preceding to the intermediate line E/2 at the time of performing the correction of the shifts of the anterior lines.

Accordingly, the distortion correction unit 108 performs the same processing as that illustrated in the flow charts of FIGS. 5 and 6 described pertaining to the first embodiment to the lines following the intermediate line E/2, and the distortion correction unit 108 uses the frame −1 as a substitute read-out source to the part located on the outside of the photographing range of the frame 0. Moreover, the distortion correction unit 108 performs the process of changing the part located on the outside of the photographing range of the frame 0 from that of the frame −1 to that of the frame 1 as the substitute read-out source in the process illustrated in the flow charts of FIGS. 5 and 6 to the lines prior to the intermediate line E/2.

Figure 9A:
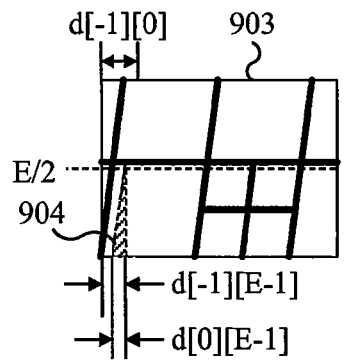
FIGS. 9A, 9B, 9C, and 9D are schematic views of photographed images for describing distortion correction in a second embodiment of the present invention.
Figure 9B:
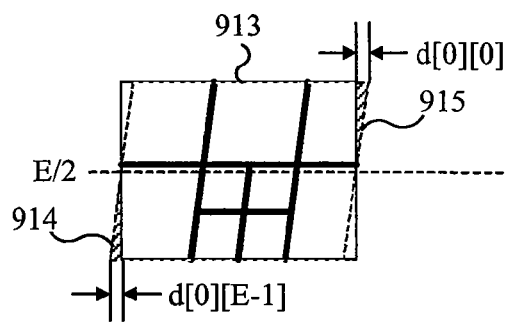
Figure 9D:
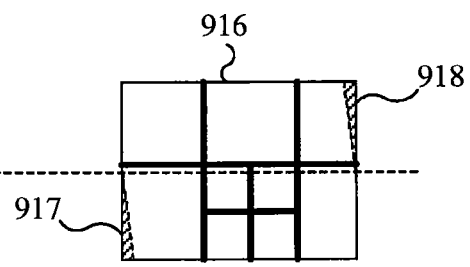
Figure 9C:
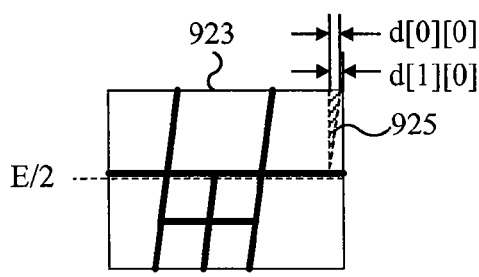

FIGS. 9A to 9D illustrates examples of distortion correction by the distortion correction unit 108 to the images photographed by the video camera 100 while moving to the direction toward the right side at a constant speed. FIGS. 9A to 9C illustrates a photographed image 903 of the frame −1, a photographed image 913 of the frame 0, and a photographed image 923 of the frame 1, respectively, which are successively photographed. Although it is necessary to read out the regions enclosed by broken lines in order to correct the distortion of the photographed image 913 of the frame 0 illustrated in FIG. 9B by using the intermediate line E/2 as a reference, a shaded area 914 and a shaded area 915 are located on the outside of the range of the photographed image 913. The shaded area 914 corresponds to a shaded area 904 included in the photographing range 903 of the frame −1 illustrated in FIG. 9A, and the shaded area 915 corresponds to a shaded area 925 included in the photographing range 923 of the frame 1 illustrated in FIG. 9C. The distortion correction unit 108 sets the shaded areas 904 and 925 as read-out sources in place of the shaded areas 914 and 915 of the frame 0, respectively. That is, the distortion correction unit 108 uses the shaded areas 904 and 925 as correction data. As a result, as illustrated in FIG. 9D, an output image 916 of the frame 0 in which distortion has been corrected is output without lacking shaded areas 917 and 918. Incidentally, the positions and the shapes of the shaded areas 917 and 918 are determined on the basis of the motion amounts of the respective lines following the intermediate line E/2 of the frame −1, the respective lines of the frame 0, and the respective lines preceding to the intermediate line E/2 of the frame 1.

According to the present embodiment, a photographed image in the central portion thereof is used as it is, and consequently the influences of correction can be made to be more inconspicuous in comparison with the first embodiment.

Third Embodiment

Next, a third embodiment of the present invention will be described.

The video camera of the present embodiment also has the same configuration as that of the video camera 100 of FIG. 1, and the description of the configuration is omitted.

In the present embodiment, the distortion correction unit 108 performs the correction of a pixel situated in the neighborhood of the boundary of a photographing range of a frame to be corrected by synthesizing a pixel read out from the frame with pixels read out from the frames photographed before and after the frame to be used for the correction at a ratio corresponding to a distance from the boundary.

For example, if the frame 0 is set to be a correction object and a lacking part of the photographing range thereof is compensated by means of the photographing range of the frame −1, the distortion correction unit 108 reads out several pixels from the boundary of the photographing range of the frame 0 while synthesizing those several pixels with corresponding several pixels of the photographing range of the frame −1 and reads out the synthesized pixels. For example, the distortion correction unit 108 synthesizes 5 pixels of the frame 0 with the weightings of 10%, 25%, 50%, 75%, and 90%, in the order of the nearness to the boundary with 5 pixels of the frame −1 at the same photographing positions with the weightings of 90%, 75%, 50%, 25%, and 10%, respectively.

According to the present embodiment, the boundary part of the partial image compensated by referring to the preceding and the following frames can be made to be more inconspicuous in comparison with the first and the second embodiments.

In the first to the third embodiments described above, the pixels of the read-out sources (the pixels read-out from the reference frames) have been described as those at the specified positions of the specified lines. However, the read-out sources are not limited to those described above, correction pixel data (output images) may be generated by performing filter operations to the peripheral lines and the peripheral pixels of read-out positions in order to obtain a better image quality. In this case, if a reference region of a filter operation expands over the photographing range of a frame, it is only necessary to adapt the distortion correction unit to set a reference region expanding over the frame.

Furthermore, if a read-out position is located on the outside of a photographing range in the first to the third embodiments described above, the video camera 100 always performs correction by using the preceding and/or the following frames. This function may also be adapted to perform the correction of the first to the third embodiments only when the motion detected by the motion detection unit 110 is determined as the panning of the video camera 100.

In the first to the third embodiments described above, the present invention has been described as the configurations of correcting the distortion of photographed images owing to the motions of the video cameras into the horizontal directions, but the following embodiments of the present invention will next be described as the configurations of correcting the distortion of a photographed image owing to a motion of the video camera into the vertical directions. Also in the following embodiments, the configuration of the video camera 100 is the same as those of the first to the third embodiments, and accordingly the description thereof is omitted.

Fourth Embodiment

Figure 10:
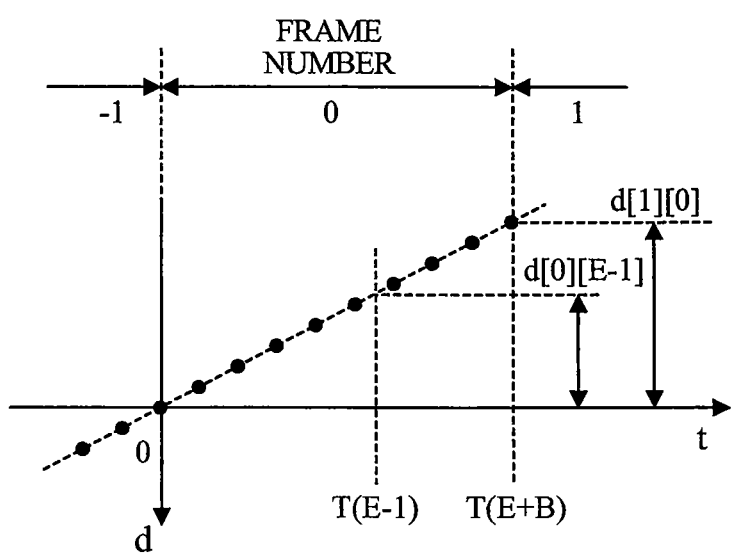
FIG. 10 is a schematic view for describing motion detection in a fourth embodiment of the present invention.

FIG. 10 illustrates examples of the motion amounts d (on the ordinate axis) in the vertical direction which motion amounts have been detected by the motion detection unit 110 in accordance with the passage of time (on the abscissa axis) when the video camera 100 has moved upwards (tilting). The motion detection unit 110 detects the motion amounts d into the vertical direction a plurality of times (black dot parts in FIG. 10) during a period in which an image signal for one frame is being output from the image pickup sensor 105. The motion amounts d are expressed here as relative positions at the photographing times of respective lines to the photographing time of the line 0 of the frame 0 which is a reference, with signs set to be positive in the direction toward the lower part in the figure. The motion amount d[0][e] at the time of outputting an arbitrary line e in the frame 0 can be obtained by interpolation using the plurality of detection results. For example, the interpolated motion amount at the time of outputting the bottom line E−1 of the effective image of the frame 0 can be expressed to be d[0][E−1].

Figure 11:
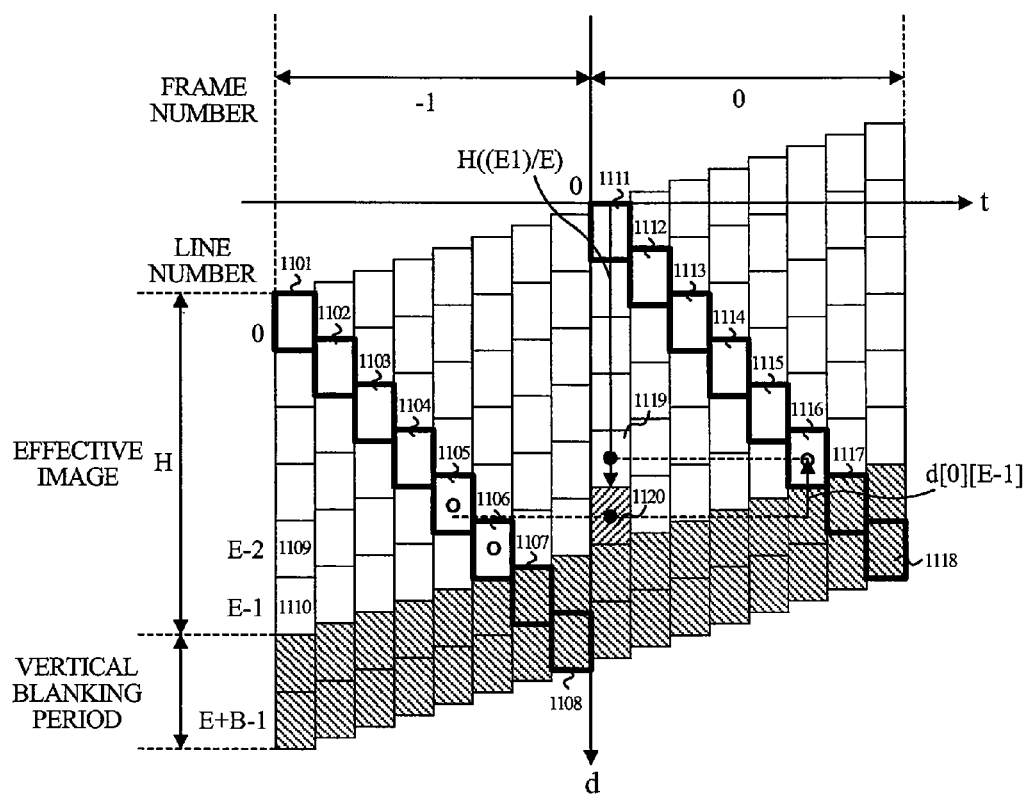
FIG. 11 is a schematic view illustrating photographing positions of respective lines of photographing frames with the passage of time.

FIG. 11 illustrates examples of the photographing positions of respective lines in accordance with the passage of time (abscissa axis) when the video camera 100 has moved upwards. The rectangular regions arranged to be 8 in the vertical direction and 16 in the horizontal direction which regions are cut off by solid lines illustrate how the respective lines of the image pickup sensor 105 is moved in accordance with the passage of time. For simplifying FIG. 11, FIG. 11 is here illustrated on the following supposition: the number of lines E of the effective image is 6; the number of lines B of the vertical blanking period is 2; and the sum of the number of lines is 8. In FIG. 11, 8 columns from the left end indicate a period of photographing the frame −1, and 8 columns from the center to the right end indicate the period of photographing the frame 0. The rectangular regions cut off by thick lines indicate lines being photographed at those times. Moreover, the vertical direction of FIG. 11 corresponds to the distance from the uppermost part of the photographed images, and overlapping in the vertical direction between the parts of adjoining thick line rectangular regions is caused by an upper-direction motion of the video camera 100 by tilting. Consequently, a photographed image (thick line regions 1111-1116) obtained under the tilting becomes one narrower in the vertical direction than one corresponding to a rectangular regions 1111-1120. If the photographed image is stored as an image of 1 frame of E lines, the photographed image becomes one expanded in the vertical direction as the image 1303 illustrated FIGS. 13B and 13C. For example, the rectangular region 1101 cut off by thick lines and being situated at the upper end of the left end indicates that the line 0 of the frame −1 is photographed at this time. The rectangular region 1102 situated on the adjacent lower-right side indicates that the line 1 is next photographed in the frame −1 that is moved into the upper direction by tilting.

The buffer memory 107 stores the photographed image data of the frame 0 which is being photographed and the preceding frame −1. The ranges 1101-1106 and 1111-1116 of the effective images among the rectangular regions 1101-1108 and 1111-1118 cut off by the thick lines in FIG. 11 indicate the photographing positions of the respective lines of the frames −1 and 0, respectively. Because each of the lines includes a time lag of the image pickup thereof, the photographing positions is gradually shifted in the vertical direction. If the vertical position of the line 0 of the frame 0 at the photographing time of the frame 0 is set to 0, the position of the line E−1 (rectangular region 1102) at the same time is $H((E-1)/E)$, and is $H((E-1)/E)+d[0][E-1]$ at the photographing time of the line E−1. H denotes the number of lines of the effective image of the image pickup sensor 105 here, and a vertical position is denoted with a sign set to be positive in the lower direction in the figure.

The distortion correction unit 108 uses a predetermined line (the line 0 in the present embodiment) as a reference and corrects the shifts of the photographing positions of the other lines of the same frame by using the motion amounts d as described above. Because the motion of the video camera 100 is performed into the vertical direction in the example of FIG. 11, the distortion correction unit 108 performs the correction of the lines of an output image by reading out the lines of a photographed image which lines are shifted into the vertical direction. For example, if the distortion correction unit 108 outputs a line E−2 of an output image, the line E−2 of the frame 0 at a reference time is situated at a position $H((E-2)/E)$ of a rectangular region 1119. Because the vertical position of the position $H((E-2)/E)$ is the same vertical position $H((E-1)/E+d[0][E-1])$ of the rectangular region 1116 of the line E−1 at the photographing time of the line E−1, the distortion correction unit 108 can perform the correction by reading out the line E−1 in place of the line E−2. That is, the images of the lines 2 to E−1 at the position corresponding to the photographing time of the line 0 used as the reference can be obtained. In order to simplify the description, here, the magnifications of the photographed image and the output image are made to be the same. Incidentally, even if there are no lines the vertical positions of which are quite the same in a photographed image, the lines of an output image can be obtained by reading out the lines having similar vertical positions to perform the interpolation processing thereof.

However, the line E−1 of the frame 0 at a reference time is situated at the position of the rectangular region 1120 (shaded area) and the position is located on the outside of the photographing range of the effective images 1111-1116. If the motion of the video camera 100 from the preceding frame −1 to the frame 0 is been performed into the same direction as illustrated in FIG. 11, the shaded area is the photographing range in the past frame, and accordingly the preceding frame −1 is used as a substitute read-out source. For example, the vertical position of the rectangular region 1120 is situated between the position of the rectangular region 1105 of the line E–2 of the frame 1 and the position of the rectangular region 1106 of the line E–1 of the frame –1, and accordingly the line E–1 of the output image can be obtained by reading out the rectangular regions 1105 and 1106 to perform their interpolation processing.

Figure 12:
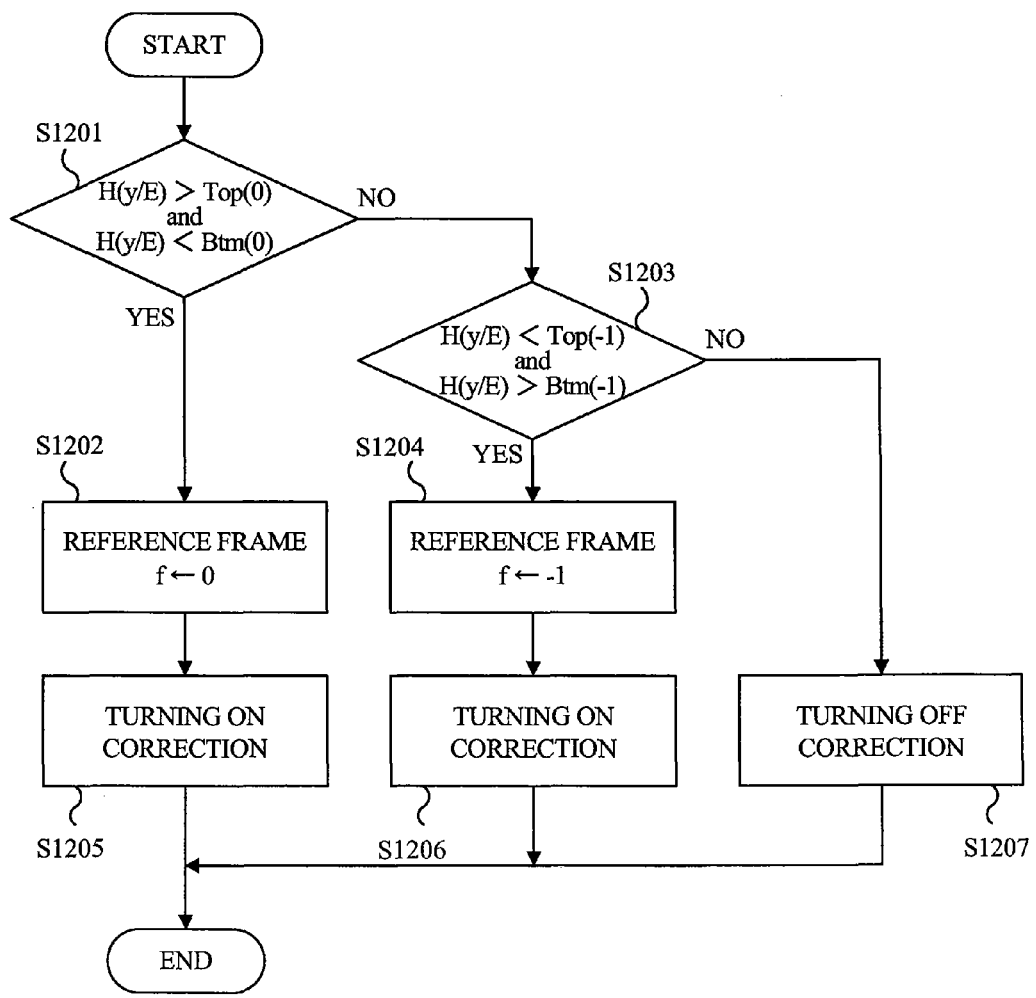
FIG. 12 is a flow chart illustrating a flow for determining the reference frame f of the lines in photographing frames.

FIG. 12 is a flow chart of the operation of the distortion correction unit 108 to determine the frame f of a photographing image of a read-out source and the on-and-off of correction at the time of outputting a line y of the frame 0 of an output image. Also the processing of the flow chart is achieved by the CPU 101 to read out a control program stored in the ROM 103 and then to execute the control program. First, at Step S1201, Top(0) denotes the photographing position of the uppermost line in the frame 0, and Btm(0) denotes the photographing position of the lowermost line in the frame 0. If the motion of the video camera 100 in the vertical direction is slower than the speed of the vertical scanning of the image pickup sensor 105, Top(0) is the photographing position of the line 0 of the frame 0, and Btm(0) is the photographing position of the line E–1 of the frame 0. The vertical position of the line y of the frame 0 at the reference time is H(y/E), and the CPU 101 determines whether the vertical position H(y/E) falls in a range between Top(0) and Btm(0) (YES), which is a photographing range of the frame 0, or not. If the vertical position H(y/E) falls in the range, the CPU 101 sets the reference frame f to 0 at Step S1202 and turns on the correction at Step S1205 to end the process. If the vertical position H(y/E) does not fall in the range at Step S1201 (NO), the CPU 101 determines whether the vertical position H(y/E) falls in a range between Top(–1) and Btm(–1), which is the photographing range of the frame (–1), or not at Step S1203. If the vertical position H(y/E) falls in the range (YES), the CPU 101 set the reference frame f to –1 at Step S1204 and turns on the correction to end the processing at Step S1206. If the vertical position H(y/E) does not also fall in the photographing range of the frame –1 (NO), the vertical position H(y/E) is located on the outside of the correction limit. Accordingly, the CPU 101 turns off the correction at Step S1207 and ends the process.

Incidentally, the CPU 101 determines whether the vertical position H(y/E) is located on the outside of the correction limit or not, for every line at Step S1203 of FIG. 12. But, if a line on which the vertical position H(y/E) is located within the correction limit and a line on which the vertical position H(y/E) is located on the outside of the correction limit are successive in the same frame, the correction amounts of the lines become discontinuous. Accordingly, it is really determined in advance whether the vertical positions of the line 0 and the line E–1 of the frame 0 at the reference time are included in a photographing range composed of the added frames 0 and –1 or not. That is, it is determined whether or not the vertical positions 0 and H((E–1)/E) are included in the added range of the range of from Top(0) to Btm(0) and the range of from Top(–1) to Btm(–1). If the vertical positions 0 and H((E–1)/E) are not included in the added range, the correction of the whole frame is turned off. This case corresponds to, for example, the case where the video camera 100 is moved downward from the frame –1 to the middle of the frame 0 and is reversed upward from the middle of the frame 0. In this case, it is determined that the vertical position of the line E–1 of the frame 0 at the reference time is not photographed in any frames and the vertical position is located on the outside of the correction limit.

Moreover, if a line capable of being used for interpolation processing as a peripheral line exists in the frame 0 even when the reference frame f is set to –1 at Step S1204 of FIG. 12, the interpolation processing can also be performed from the lines of the frame –1 and the frame 0. For example, because the line E–1 of the frame 0 is situated at the position of the rectangular region 1120 (shaded area) at the reference time in FIG. 11, the rectangular region 1105 of the line E–2 in the frame –1 and the rectangular region 1106 of the line E–1 in the frame –1 are led to be used if the linearly interpolate is performed by using nearby two lines. On the other hand, if the rectangular region 1116 of the line E–1 of the frame 0 is situated nearer to the rectangular region 1120 than the rectangular region 1105, the liner interpolation can be performed by using the two lines of the rectangular region 1116 and the rectangular region 1106 of the line E–1 of the frame –1.

FIGS. 13A to 13G illustrates examples of distortion correction by the distortion correction unit 108 to the images photographed by the video camera 100 while moving upward at a constant speed. As illustrated in FIGS. 13A and 13B, a range 1301 of an object 1300 is photographed in the frame –1, and a photographed image 1303, which is vertically expanded, is stored in the buffer memory 107. Moreover, as illustrated in FIGS. 13D and 13E, a range 1311 of the object 1300 is photographed in the frame 0, and a photographed image 1313, which is vertically expanded, is stored in the buffer memory 107. Although it is necessary to read out the region enclosed by a broken line illustrated in FIG. 13F to vertically contract the photographed image 1313 in order to correct the distortion of the photographed image 1313 by using the first line thereof as a reference, the shaded area 1314 is located on the outside of the range of the photographed image 1313. This part corresponds to a shaded area 1312 contacting with the photographing range 1311 of the frame 0 illustrated in FIG. 13D, and the shaded area 1312 is included in the photographing range 1301 of the frame –1 illustrated in FIG. 13A. By the processing of the flow chart illustrated in FIG. 12, the distortion correction unit 108 sets a shaded area 1304 included in the photographed image 1303 of the frame –1 illustrated in FIG. 13C as a read-out source in place of the shaded area 1314 being located on the outside of the photographed image 1313 of the frame 0. As a result, as illustrated in FIG. 13G, an output image 1315 of the frame 0 in which distortion is corrected is output without lacking a shaded area 1316 of the frame 0.

As described above, the distortion brought about at the time of tilting into the upper direction is corrected by using not only the frame 0 but also the frame –1 as read-out sources (reference frames).

Figure 14B:
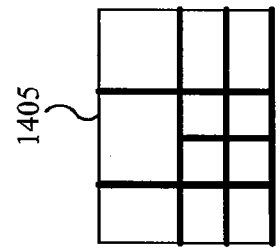
FIGS. 14A, 14B, 14C, and 14D are schematic views of photographed images for describing the distortion correction of the photographed images brought about by tilting into the lower direction.
Figure 14C:
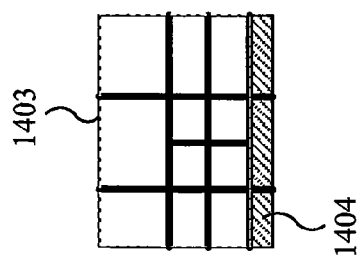
Figure 14D:
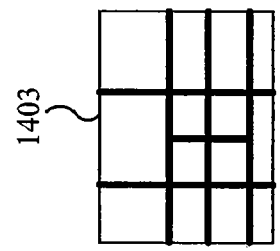
Figure 14A:
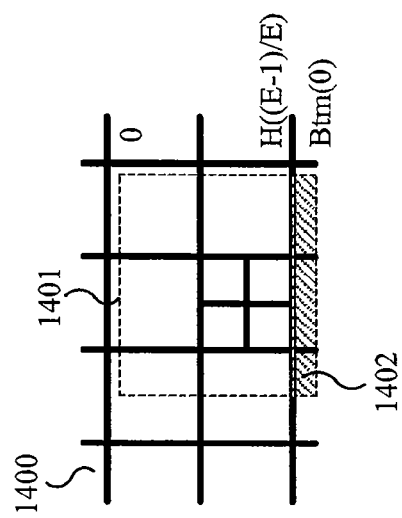

FIGS. 14A to 14D illustrate examples of distortion correction by the distortion correction unit 108 to the images photographed by the video camera 100 while moving downward at a constant speed. As illustrated in FIGS. 14A and 14B, a range 1401 of an object 1400 is photographed in the frame 0, and a vertically contracted photographed image 1403 is stored in the buffer memory 107. In order to correct the distortion of the photographed image 1403 by using the first line as a reference, it is necessary to read out the region enclosed by a broken line illustrated in FIG. 14C to vertically expand the read-out region. Contrary to the case of tilting into the upper direction, the read-out range is contained in the photographed image 1403, and a shaded area 1404 is in excess. The shaded area 1404 corresponds to a shaded area 1402 contained in the photographing range 1401 of the frame 0 illustrated in FIG. 14A. By the process of the flow chart, the distortion correction unit 108 outputs an output image 1405 of the frame 0 in which distortion as been corrected as illustrated in FIG. 14D by using only the photographed image 1403 of the frame 0 as a read-out source.

As described above, the distortion brought about by the tilting into lower direction of the video camera 100 is corrected only by using the frame 0.

According to the fourth embodiment of the present invention described above, the distortion of a photographed image brought about by the image pickup sensor 105 of the rolling-shutter type can be corrected without narrowing the angle of view of an output image of a photographed image. Moreover, the rolling-shutter distortion of a photographed image can be corrected only by the read-out control of a picked-up image without introducing any configuration, such as that of replacing a scanning direction, to the image pickup sensor 105.

Fifth Embodiment

Next, a fifth embodiment of the present invention will be described.

In the present embodiment, the distortion correction unit 108 uses an intermediate line as a reference in place of the first line to correct the shifts of the photographing ranges of the other lines in the same frame.

The output timing of the intermediate line E/2 as the reference is set to 0, and the motion amount d[0][e] of an arbitrary line e in the frame 0 at the time of outputting can be obtained from a detection result of the motion detection unit 110. For example, the motion amount of the first line 0 of the frame 0 at the time of the output thereof is d[0][0], and the motion amount of the bottom line E−1 at the time of the output thereof is d[0][E−1].

The buffer memory 107 stores the photographed image data of the frame 1 which is being photographed, the preceding frame 0, and the frame −1 preceding to the frame 1 by two frames, and the distortion correction unit 108 performs distortion correction of the frame 0. The distortion correction unit 108 uses the intermediate line E/2 as the reference and corrects the shifts of the photographing positions of the other lines of the same frame. If the motion of the video camera 100 is performed into the upper vertical direction, the distortion correction unit 108 needs a past photographing range at the time of correcting the lines posterior to the intermediate line E/2 and being located on the outside of the photographing range similarly to the fourth embodiment. On the other hand, the distortion correction unit 108 needs a future photographing range at the time of correcting the lines preceding to the intermediate line E/2 and being located on the outside of the photographing range.

Accordingly, the distortion correction unit 108 performs the same process as that illustrated in the flow chart of FIG. 12 described pertaining to the fourth embodiment to the lines posterior to the intermediate line E/2, and the distortion correction unit 108 uses the frame −1 as a substitute read-out source to the parts being located on the outside of the photographing range of the frame 0. Moreover, the distortion correction unit 108 performs the process of changing the frame −1 of the processing illustrated in the flow charts of FIG. 12 to the frame 1 to be used as the substitute read-out source to the lines prior to the intermediate line E/2.

Figure 15A:
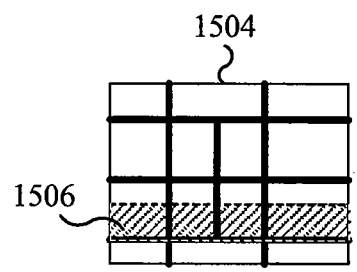
FIGS. 15A, 15B, 15C, and 15D are schematic views of photographed images for describing the distortion correction of the photographed images in a fifth embodiment of the present invention.
Figure 15B:
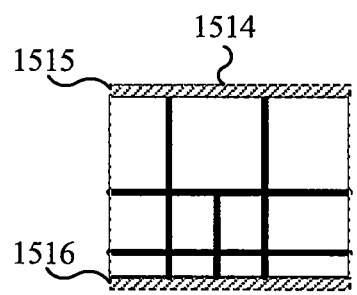
Figure 15D:
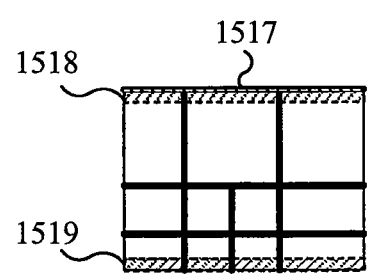
Figure 15C:
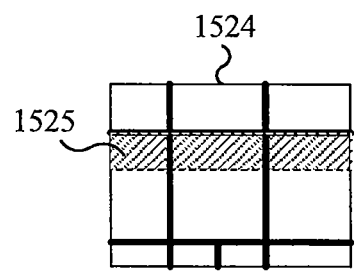
Figure 16F:
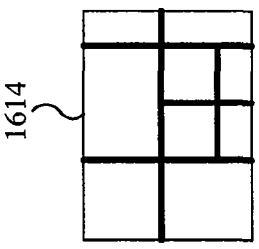
FIGS. 16A, 16B, 16C, 16D, 16E, and 16F are schematic views of photographed images for describing distortion correction brought about the panning of a camera by a conventional technique.
Figure 16E:
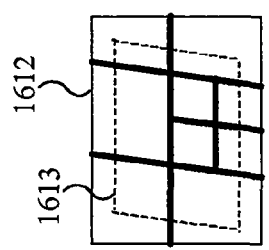
Figure 16B:
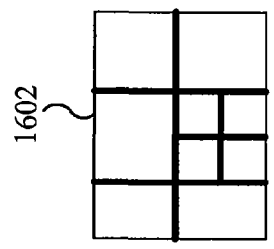
Figure 16D:
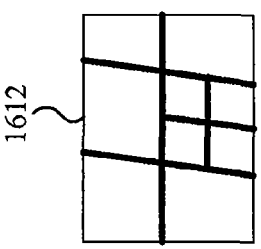
Figure 16A:
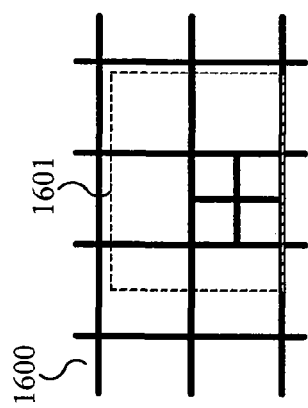
Figure 16C:
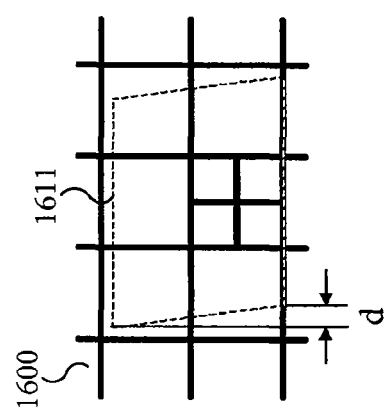
Figure 17B:
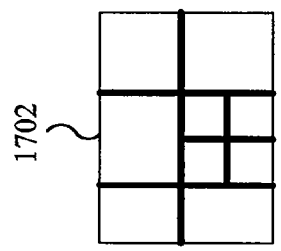
FIGS. 17A, 17B, 17C, 17D, 17E, 17F, 17G, 17H, 17I, and 17J are schematic views of photographed images for describing the examples of the distortion correction of the photographed images by the conventional technique.
Figure 17A:
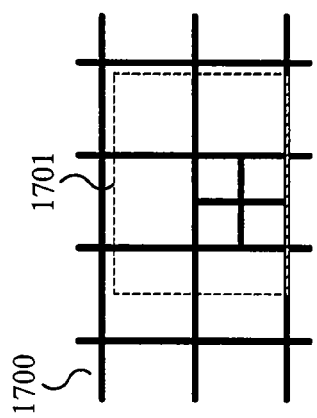
Figure 17D:
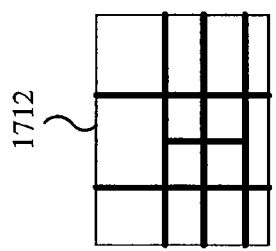
Figure 17C:
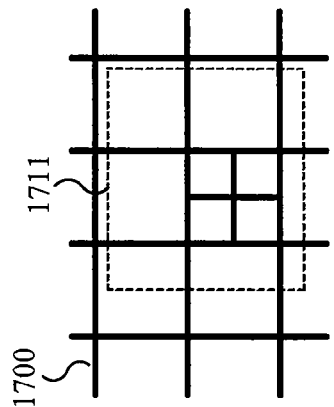
Figure 17E:
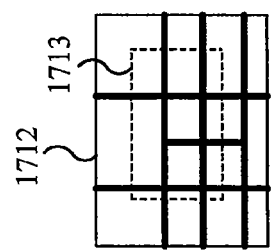
Figure 17F:
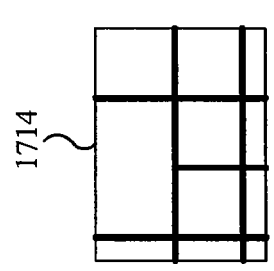
Figure 17H:
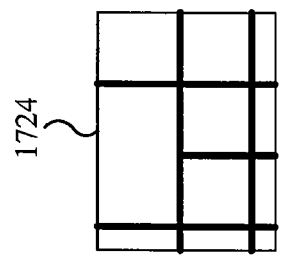
Figure 17I:
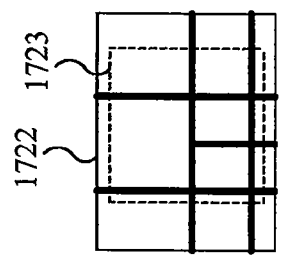
Figure 17J:
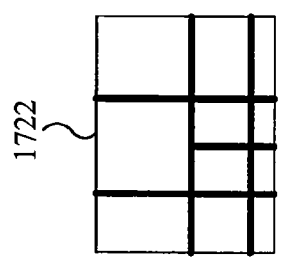
Figure 17G:
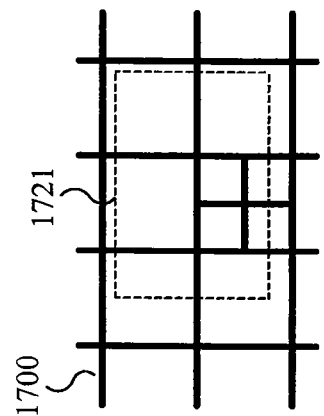

FIGS. 15A to 15D illustrates examples of distortion correction by the distortion correction unit 108 to the images photographed by the video camera 100 while moving to the upward direction at a constant speed. FIGS. 15A to 15C illustrates the photographed image 1504 of the frame −1, the photographed image 1514 of the frame 0, and the photographed image 1524 of the frame 1, respectively, which photographed images 1504, 1514, and 1524 are successively photographed. Although it is necessary to read out the region enclosed by a broken line in order to correct the distortion of the photographed image 1514 of the frame 0 by using the intermediate line E/2 as a reference, a shaded area 1515 and a shaded area 1516 are located on the outside of the range of the photographed image 1514. The shaded area 1516 corresponds to a shaded area 1506 included in the photographed image 1504 of the frame −1 illustrated in FIG. 15A, and the shaded area 1515 corresponds to a shaded area 1525 included in the photographing range 1524 of the frame 1 illustrated in FIG. 15C. The distortion correction unit 108 sets the shaded areas 1525 and 1506 as read-out sources in place of the shaded areas 1515 and 1516 of the frame 0, respectively. As a result, as illustrated in FIG. 15D, an output image 1517 of the frame 0 in which distortion is corrected is output without lacking a shaded area 1518 and a shaded area 1519.

Incidentally, the distortion brought about tilting into the lower direction is corrected only by using the frame 0 similarly to the fourth embodiment.

Because the video camera 100 of the present embodiment uses the central part of a photographed image as it is in comparison with the video camera 100 of the fourth embodiment, the influences of correction can be made to be inconspicuous in a photographed image.

Also in the fourth and the fifth embodiments described above, the read-out sources (the pixels read-out from the reference frame) have been described as the specified positions of the specified lines. However, in order to obtain a better image quality, the correction pixel data (output images) may be generated by performing filter operations to peripheral lines and peripheral pixels at read-out positions. In this case, if a reference region of a filter operation expands over the photographing range of a frame, it is only necessary to adapt the distortion correction unit 108 to set a reference region expanding over the frame.

Furthermore, if a read-out position is located on the outside of a photographing range in the fourth and the fifth embodiments described above, the video camera 100 always performs correction by using the preceding and/or the following frames. This function may also be adapted to perform the correction of the fourth and the fifth embodiments only when a motion detected by the motion detection unit 110 is determined as tilting of the video camera 100.

In the fourth and the fifth embodiments, if a read-out position is located on the outside of a photographing range, the video camera 100 always performs a correction by using the preceding and/or the following frames. However, this function may also be adapted to perform the correction only when the motion detected by the motion detection unit 110 is determined as tilting of the video camera 100.

The function of each processing illustrated in FIGS. 5, 6 and 12 is realized by the CPU 101 by reading out the control program for realizing the function of the processing from a memory (ROM 103) to execute the control program in the embodiments described above. However, the realization method of the functions is not limited to the one mentioned above, a part of or all of the functions of the respective processing illustrated in FIGS. 5, 6, and 12 may be realized by dedicated hardware. Moreover, the memory mentioned above may be composed of a magneto-optical disk device, a non-volatile memory, such as a flash memory, or a read-only recording medium, such as a CD-ROM. Furthermore, the memory may be composed of a computer-readable and writable recording medium that is a combination of the above-mentioned media.

Moreover, the "computer-readable recording medium" indicates a storage device, such as a portable medium, such as a flexible disk, a magneto-optical disk, a ROM, and a CD-ROM; and a hard disk incorporated in a computer system.

Moreover, the program mentioned above may be transmitted from a computer system storing the program into a storage device or the like to another computer system through a transmission medium or a transmission wave in a transmission medium. The "transmission medium" transmitting the program here indicates a medium having the function of transmitting information, such as a network (communication network) such as the Internet, and a communication circuit (communication line) such as a telephone line. In this case, a medium holding a program for a certain time, such as a volatile memory (RAM) of a server or a client in a computer system when a program is transmitted, is also supposed to be included in the "computer-readable recording medium."

Moreover, the program mentioned above may be the one for realizing a part of the functions mentioned above. Furthermore, the program may also be a program capable of realizing the functions mentioned above in combination with a program that has already been recorded in a computer system, the so-called differential file (differential program).

Moreover, a program product, such as a computer readable recording medium recording the program mentioned above, can also be applied as an embodiment of the present invention. The programs mentioned above, the recording media, the transmission media, and the program product are included in the scope of the present invention.

In the above, the embodiments of the present invention have been described with reference to the accompanying drawings, but concrete configurations thereof are not limited to those of the embodiments, and a design that does not depart from the sprit and scope of the present invention is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-174526 filed on Aug. 3, 2010, which is hereby incorporated by reference herein in its entirety.

What is claimed is:

1. An image pickup apparatus, comprising:
    a photographing unit continuously photographing a plurality of frames in accordance with a rolling-shutter method;
    a buffer memory configured to store a photographed image of a plurality of photographed frames;
    a motion detection unit configured to continuously detect a motion amount of an object a plurality of times;
    a memory configured to store the detected motion amounts;
    a correction unit configured to read out the photographed image stored in the buffer memory; and
    an output unit configured to output an image corrected by the correction unit;
    wherein the correction unit determines from which position in the plurality of photographed frames a pixel of each of lines of the image to be output is read out, on the basis of the motion amount at a photographing time of each of the lines of a predetermined frame of the photographed image, and
    wherein if the determined read-out position is located on the outside of a photographing range of the predetermined frame, the correction unit then determines to read out a corresponding pixel in a frame photographed before and/or after a time of photographing the predetermine frame as the pixel of the image to be output, and calculates a read-out position of the corresponding pixel on the basis of the motion amount at the photographing time of each of the lines in the frame from which the corresponding pixel is read out.

2. The image pickup apparatus according to claim 1, wherein the correction unit determines from which position of the predetermined frame the pixel of each of the lines of the image to be output is read out on the basis of the motion amount at the photographing time of each of the lines by using the photographing time of the first line of the predetermined frame as a reference, and
    wherein if the determined read-out position is located on the outside of the photographing range of the predetermined frame, then the correction unit reads out the corresponding pixel of the frame photographed just before the predetermined frame as the pixel of the image to be output.

3. The image pickup apparatus according to claim 1, wherein if the determined read-out position of the pixel to be read out as the pixel of the image to be output is located on the outside of the photographing ranges of the predetermined frame and the frames photographed before and after the predetermined frame, the correction unit then determines the read-out position of the line in a range which is not larger than the photographing ranges of the predetermined frame and the frames photographed before and after the predetermined frame and calculates the read-out position of the pixel to be read out as the pixel of the image to be output on the basis of the determined read-out position of the line.

4. The image pickup apparatus according to claim 1, wherein the correction unit determines, by using the photographing time of an intermediate line of the predetermined frame of the photographed image as a reference, the read-out position of each of the lines of the predetermined frame on the basis of the motion amount at the photographing time of each of the lines, and
    wherein if a pixel included in each of the lines the read-out position of which is determined is located on the photographing range of the predetermined frame, the correction unit reads out a pixel as the pixel of the image to be output from the frame photographed just before or just after the predetermined frame in accordance with whether the line of the pixel of the image to be output is located before or after the intermediate line thereof.

5. The image pickup apparatus according to claim 1, wherein the correction unit determines the read-out position of each of the lines of the predetermined frame on the basis of the motion amount at the photographing time of each of the lines of the predetermined frame of the photographed image, and
    wherein in a case where the pixel included in each of the lines the read-out positions of which is determined is located near to a boundary of the photographing range of the predetermined frame, the correction unit synthesizes a pixel read-out from the predetermined frame and a pixel read out from the frame photographed before and/or after the predetermined frame at a ratio corresponding to a distance from the boundary, and calculates a read-out position of the pixel of the frame photographed before and/or after the predetermined frame on the basis of a motion amount at a photographing time of each of the lines of the frame photographed before and/or after the predetermined frame.

6. The image pickup apparatus according to claim 1, further comprising:

a determination unit configured to determine whether the apparatus is panning or tilting or not on the basis of motion amounts obtained by detections performed by the motion detection unit a plurality of times continuously, wherein the correction unit reads out the photographed image from the buffer memory on the basis of the detected motion amounts only when the apparatus is panning or tilting.

7. An image processing method of an image photographed by an image pickup apparatus including a photographing unit configured to continuously photograph a plurality of frames in accordance with a rolling-shutter method, a buffer memory configured to store a photographed image of the plurality of photographed frames, a motion detection unit configured to detect a motion amount of an object a plurality of times continuously, and a memory configured to store the detected motion amounts, the method comprising the steps of:

reading out the photographed image stored in the buffer memory; and outputting an image corrected in the reading step, wherein the reading step includes:

determining from which position in the plurality of photographed frames a pixel of each of lines of the image to be output is read out, on the basis of the motion amount at a photographing time of each of the lines of a predetermined frame of the photographed image, and if the determined read-out position is located on the outside of a photographing range of the predetermined frame, then determining to read out a corresponding pixel in a frame photographed before and/or after a time of photographing the predetermine frame as the pixel of the image to be output, and calculating a read-out position of the corresponding pixel on the basis of the motion amount at the photographing time of each of the lines in the frame from which the corresponding pixel is read out.

8. A non-transitory computer-readable storage medium storing a program for a computer in a image pickup apparatus including a photographing unit configured to continuously photograph a plurality of frames in accordance with a rolling-shutter method, a buffer memory configured to store a photographed image of a plurality of photographed frames, a motion detection unit configured to continuously detect a motion amount of an object a plurality of times, and a memory configured to store the detected motion amounts, the program enabling the computer to function as:

a correction unit to read out the photographed image stored in the buffer memory by determining from which position in the plurality of photographed frames a pixel of each of lines of the image to be output is read out, on the basis of the motion amount at a photographing time of each of the lines of a predetermined frame of the photographed image, and if the determined read-out position is located on the outside of a photographing range of the predetermined frame, then determining to read out a corresponding pixel in a frame photographed before and/or after a time of photographing the predetermine frame as the pixel of the image to be output and calculating a read-out position of the corresponding pixel on the basis of the motion amount at the photographing time of each of the lines in the frame from which the corresponding pixel is read out; and an output unit to output an image corrected by the correction unit.

* * * * *